United States Patent [19]
Kurtz et al.

[11] 3,809,457
[45] May 7, 1974

[54] RADIATION-REDISTRIBUTIVE DEVICES

[75] Inventors: Clark Nelson Kurtz; James John De Palma, both of Rochester, N.Y.

[73] Assignee: Eastman Kodak Company, Rochester, N.Y.

[22] Filed: Oct. 13, 1972

[21] Appl. No.: 297,556

[52] U.S. Cl. ............................... 350/128, 350/129
[51] Int. Cl. ............................................. G03b 21/60
[58] Field of Search ............................ 350/128, 129

[56] References Cited
UNITED STATES PATENTS
2,804,801   9/1957   Mihalakis ........................... 350/129
3,257,900   6/1966   Goodbar et al. .................. 350/128 X Primary Examiner—Samuel S. Matthews
Assistant Examiner—Richard A. Wintercorn
Attorney, Agent, or Firm—Douglas I. Hague

[57] ABSTRACT

Radiation-redistributive devices, such as front and rear projection screens, including an optical layer wherein the optical path length, measured in at least one plane normal to the surface of such layer, randomly varies in such a manner that radiation normally incident on all small areas of the layer which intersect such plane is redirected by each point on such area which intersects such plane at an angle which is predictable only to the extent that the total redirected radiation from such points of each of such areas produces a common predesired redistribution profile, preferably rectangular in shape, as measured in said plane along a line substantially parallel to the surface of the optical layer. A method and apparatus for fabricating such a device is also disclosed.

34 Claims, 16 Drawing Figures

PATENTED MAY 7 1974 3,809,457

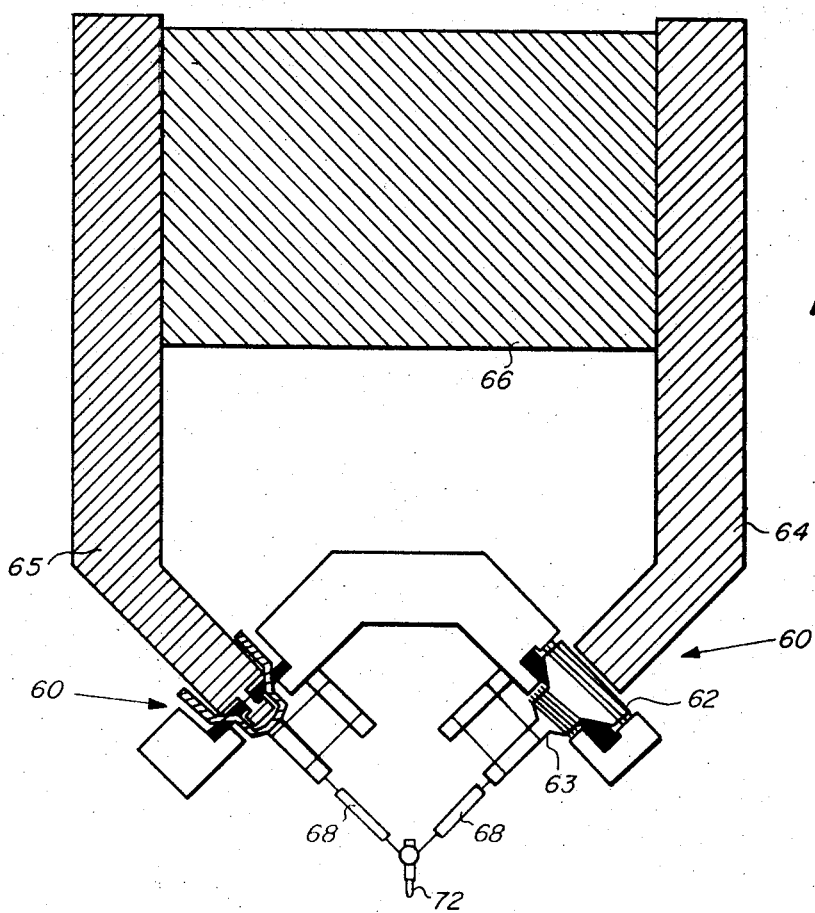
FIG. 9
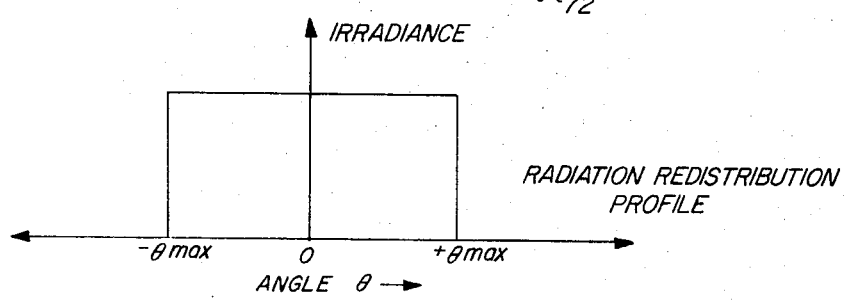
FIG. 4 RADIATION REDISTRIBUTION PROFILE
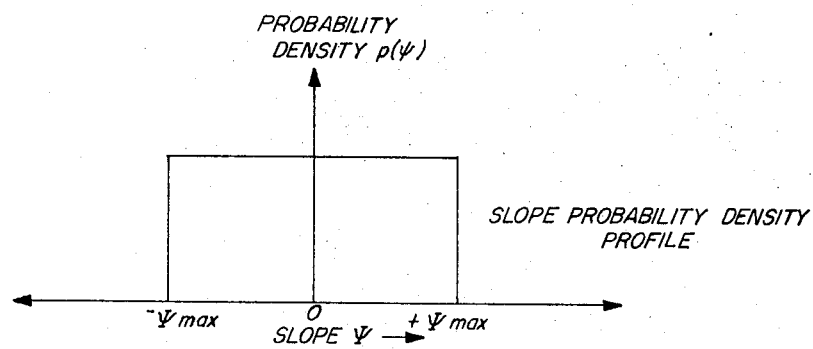
FIG. 5 SLOPE PROBABILITY DENSITY PROFILE

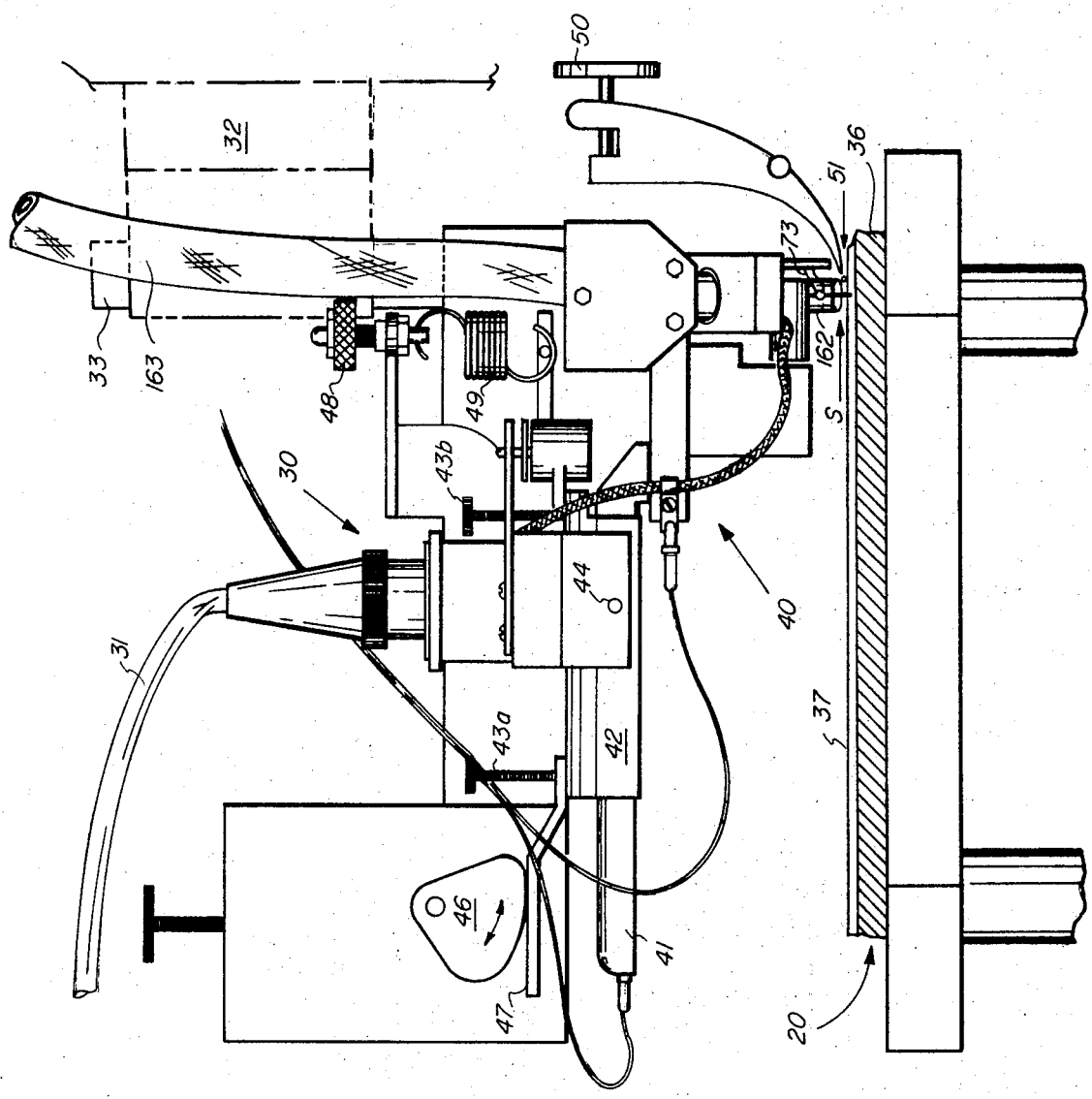

RADIATION-REDISTRIBUTIVE DEVICES

BACKGROUND OF THE INVENTION

The present invention relates to improvements in radiation-redistributive devices such as front and rear projection screens. Additionally, this invention relates to methods and apparatus for fabricating such devices.

Commonly assigned U.S. application Ser. No. 207,084, filed on Dec. 13, 1971 in the names of H. O. Hoadley et al., discloses radiation-redistributive devices (e.g., front and rear projection screens) which are capable of controllably redistributing normally incident radiation throughout a predesired volume in which the intended viewer is to be situated. In general, such devices comprise a plastic surface in which contiguous rows of optical microelements are formed, each microelement serving to redistribute normally incident radiation throughout a desired solid angle of rectangular cross section. The fabrication of such devices involves the manufacture of a master from which the plastic surfaces of such devices can be cast or otherwise replicated. The master is produced by a cutting technique in which the master surface is moved relative to a cutting tool in a series of equally spaced parallel traverses while the cutting depth of the tool is electrically modulated in accordance with a somewhat sinusoidal waveform. This results in a surface comprised of rectilinear rows of microelements which vary in shape along the row from convex to concave.

Since slight changes in the phase relationship between optical microelements of adjacent rows give rise to a surface having a streaky appearance, and since such changes are quite difficult to control during the cutting of the master, the signal used to modulate the cutting position of the cutting tool is intentionally randomized in frequency so as to produce rows of optical microelements which randomly vary in size along the row length. In addition to virtually eliminating the above-mentioned streaky appearance, such randomization produces a surface having a somewhat textured or velvet-like appearance. To assure that each microelement, regardless of size, redistributes radiation in a manner substantially identical to that of all other microelements, the size of the microelements is varied at a rate which is slow relative to the spatial frequency of the microelements, and the radius of curvature is varied in accordance with the microelement size. This assures that each microelement retains its integrity, or shape, as the size of the microelements gradually changes along the row.

Radiation-redistributive surfaces comprised of contiguous rectilinear rows of individual microelements of varying sizes exhibit a marked improvement in aesthetic appearance over similar surfaces comprised of substantially equisized microelements which vary slightly in phase from row to row. However, such surfaces, by virtue of the fact that they are made up of rows of discrete, well-defined microelements, still exhibit some diffraction effects when irradiated (e.g., dark bands) which are somewhat unpleasant to the eye. These effects become more severe as the microelements are made smaller, making it difficult to realize a high quality surface in which the microelements themselves are small enough to be unresolvable by the eye.

SUMMARY OF THE INVENTION

It is an object of the present invention to further improve the aesthetic appearance of radiation-redistributive devices of the type in which each small area, when irradiated, reflects, refracts, or otherwise redirects normally incident radiation in such a manner as to produce a predesired redistribution profile.

Another object of this invention is to provide front and rear projection screen surfaces having optical path length variations which are random, at least in one transverse dimension, to the extent that well-defined optical microelements are not formed in such surfaces, but which surfaces are adapted to redirect normally incident light in a solid angle of substantially rectangular cross section.

Another object of the invention is to provide a projection screen surface having random structure thereon which causes all small areas on the screen surface to appear uniformly bright when viewed from within a solid angle of substantially rectangular cross section along any line parallel to one of the edges of the rectangular cross section of the solid angle.

Another object of the invention is to provide front and rear projection screens wherein all reasonably small areas on the screen surface redirect normally incident light into solid angles of the same size and shape.

A further object of the invention is to provide a method and apparatus for manufacturing radiation-redistributive devices of the type herein described.

These and other objects of the invention are accomplished by the provision of radiation-redistributive devices which comprise an optical layer in which the optical path length, measured in at least one plane normal to the surface of such layer, varies in such a manner that radiation incident on a small area of the layer (i.e., an area which is small compared to the entire area of the layer itself, but nevertheless is large compared to the transverse structure defining optical path length variations within the layer) is redirected into such plane in an amount and at an angle which is predictable only to the extent that a predesired redistribution profile, preferably essentially rectangular in shape, is produced in such plane collectively by all points on the irradiated area which direct radiation into such plane. One method of producing such variation in optical path length, at least in one plane normal to the surface of such layer, is by cutting a plurality of contiguous grooves in the optical layer, such grooves varying in depth along the groove length according to a waveform which is random at least to the extent that the slope of such waveform is, at any point, unpredictable from a knowledge of the slope at other points on the waveform (although falling within a predictable range of slope values) and which waveform has the property that its slope probability density profile (i.e., its frequency distribution of slope values) has a shape which approximates that of a desired radiation-redistribution profile. Redistribution of incident radiation in a plane perpendicular to the groove length is controlled by the transverse cross section of the groove, which typically is in the shape of a well-defined optical microelement. Circuitry is disclosed herein for generating an electrical signal of such random waveform whereby the cutting position of a groove cutting stylus can be electrically modulated during the cutting operation to produce grooves having a depth profile in accordance with such random waveform. The requisite random optical path variations are also producible in both of mutually perpendicular planes by the photographic techniques disclosed in Ser. No. 186,130, filed on Oct. 4, 1971 in the name of R. L. Lamberts. This technique derives the advantages of controlling the radiation-redistributive properties at all points in the volume where radiation is redistributed by random optical path variations, rather than relying on the curvature of a surface of a microelement nature such as produced by a cutting tool of fixed contour to distribute light in one dimension.

Other objects of the invention and its various advantages will become immediately apparent to skilled members of the art from the ensuing detailed description of preferred embodiments of the invention, reference being made to the accompanying drawings.

BRIEF DESCRIPTION OF THE DRAWINGS

FIG. 4 illustrates an arbitrary redistribution profile capable of being substantially achieved by the radiation-redistributive devices of the invention;

FIG. 5 illustrates the approximate shape of the slope probability density profile of the random optical path variation necessary to produce redistribution profile of FIG. 4;

FIG. 8 is a side elevation of apparatus adapted to cut a master from which radiation-redistributive devices according to the invention can be replicated;

FIG. 9 is a constructional front elevation of a portion of a sound-recording head comprising the cutting apparatus of FIG. 8;

DETAILED DESCRIPTION OF PREFERRED EMBODIMENTS

Figure 1:
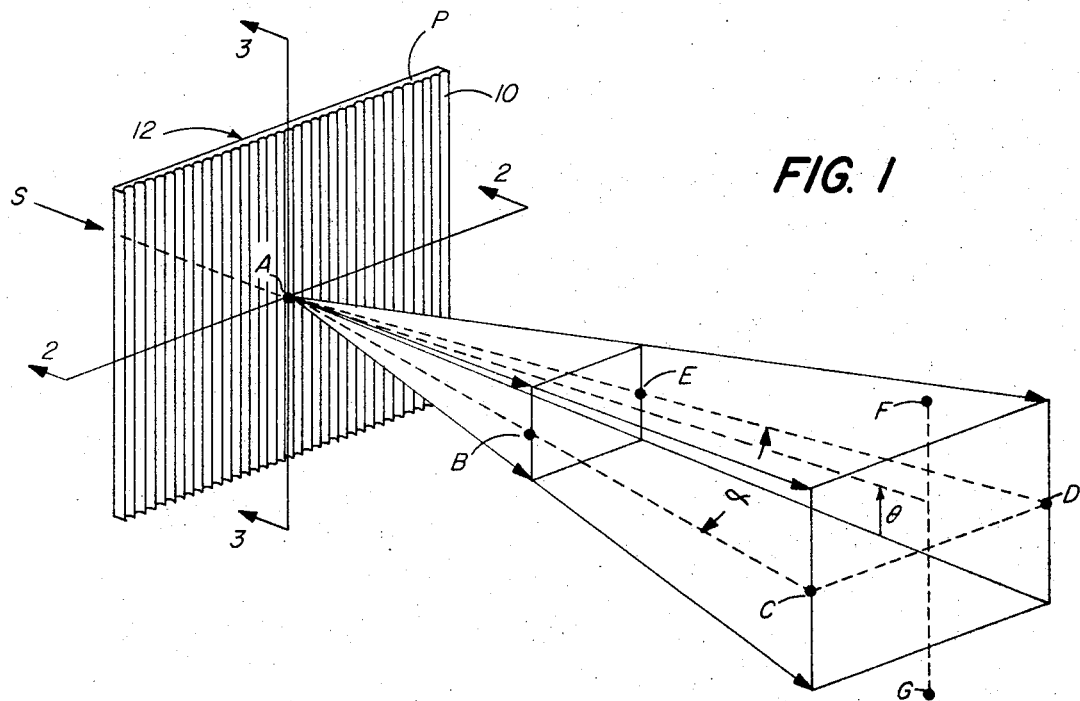
FIG. 1 is a perspective view of a radiation-redistributive device according to the invention, illustrating the manner in which normally incident radiation is redistributed thereby.

In FIG. 1, a refractive radiation-redistributive device (e.g., a rear projection screen) structured in accordance with a preferred embodiment of the invention is shown to comprise a transparent plate P, such as a sheet of glass or plastic material, having at least one surface wherein a plurality of contiguous rectilinear grooves 10 are formed. As best shown in the magnified transverse and longitudinal cross sections illustrated in FIGS. 2 and 3, respectively, each of the grooves has a transverse cross section which is concave toward the rear surface 12 of plate P, and a longitudinal cross section or depth profile which varies in a somewhat random fashion along the groove length. When the device is used as a projection screen, the average width of the grooves is preferably selected so as to be smaller than the resolution limit of the closest intended viewer; typically, the average width is within the range of 1 to 10 mils.

When the device is arranged such that the grooves extend vertically, such as shown in FIG. 1, the transverse cross section of each of the grooves, when irradiated by source S at small area A, serves to redistribute normally incident radiation in a horizontal plane ABCDE, within a predefined angular range $\alpha$. The angular range and the irradiance pattern according to which normally incident radiation is redistributed throughout such range (characterized by the "redistribution profile") is determined by the contour of the transverse cross section of each of the grooves, such contour serving to vary the optical path length in the horizontal plane across each of the grooves as traversed by the incident radiation. The aforementioned application Ser. No. 207,084 discloses equations defining the transverse groove profile required to make area A appear uniformly bright when viewed from anywhere within the angular range $\alpha$ along a line CD which extends in a direction parallel to surface S in the plane of the transverse cross section. Generally speaking, however, the angular range $\alpha$ and the uniformity with which radiation is redistributed throughout such angular range is governed by the "slope probability density profile" (i.e., the frequency distribution of slope values) of the curve according to which the contour of the transverse cross section of the grooves is determined. "Slope," as used herein, is the rate of change in optical path with respect to a transverse coordinate. In the aforementioned application, the equations presented define a curve having the properly shaped slope probability density profile to make small area A appear uniformly bright when viewed from any point on line CD.

Figure 3:
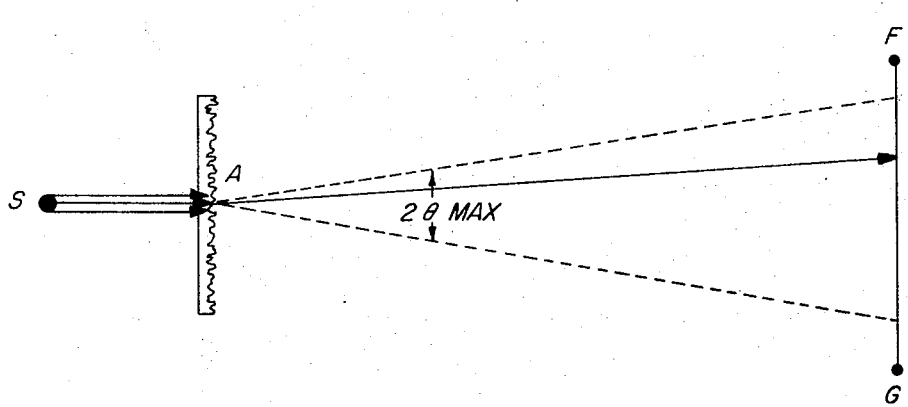

Redistribution of incident radiation in a plane parallel to the groove length (i.e., along line FG in the vertical plane in FIG. 1) is, of course, effected by changes in optical path length occurring in a direction parallel to the groove length, such optical path length variations being determined by the contour of the longitudinal cross section of the grooves. Unlike the microelement-type contour of the transverse cross section, the contour of the longitudinal cross section is, as shown in FIG. 3, somewhat random in nature, being random to the extent that the slope at any point on the contour is not predictable (within a predefined range of slope values, and as restricted by the frequency spectrum of the random contour) from a knowledge of the slope at other points on the contour, but is predictable to the extent that, on the average, the slope probability density profile, over the irradiated area A, has substantially the same shape as the radiation-redistribution profile desired from that area. Thus, while it remains to the laws of chance what slope is present at any particular point along the groove length and, hence, what angle $\theta$ a ray of radiation normally incident at such point will be redirected, the range of slope values (hence, the maximum angle $\theta_{max}$ at which incident radiation can be deflected) and the relative frequency of occurrence thereof are preselected, thereby predetermining the radiation-redistribution profile imparted by the random optical path variation occurring along the groove length. Preferably, the radiation-redistributing profile as measured along a vertical line FG in FIG. 1, has a substantially rectangular shape as shown in FIG. 4. In order for each small area A on surface S to produce this redistribution profile, the slope probability density profile of the optical path variation must have a similar shape, such as illustrated in FIG. 5. A rectangularly-shaped slope probability density profile indicates that all slope values are equally likely within a range of slope values $\pm \psi_{max}$ where the slope $\psi$ is related to the angular direction $\theta$ by the expression $\theta = \sin^{-1} \psi$, where $\psi_{max}$ and $\theta_{max}$ represent the maximum slope and angle as illustrated in FIGS. 4 and 5. The production of such a rectangular redistribution profile has not been heretofore possible from a surface exhibiting random optical path variations in any dimension.

Normally incident light is directed from small area A into a solid angle of substantially rectangular cross section, as shown in FIG. 1. The cross section is substantially rectangular because of the form of the optical path variation of the grooves. Since a groove has a fixed transverse cross section, the random optical path variations along a groove measured in any plane normal to the surface and parallel to the groove length is the same, no matter where on the transverse cross section that plane intersects the groove. Similarly, the optical path variation of the cross section is independent of the position along the groove length where the cross section is examined. This is more precisely stated by defining two coordinate axes in the plane of the optical element, one in the direction of the groove length denoted $x$ and one perpendicular denoted $y$. Then the optical path variation of a groove is a function of both $x$ and $y$, as denoted by $\phi(x,y)$. The optical path variation along the groove is a function of $x$ only, i.e., $\phi(x)$, the random optical path variation having a predesired slope probability density, while the variation of optical path along a cross section is a function of $y$ only, denoted $\phi_c(y)$. The variation $\phi_c(y)$ is provided by the contour of the transverse cross section of the groove. The independence of $\phi(x)$ from coordinate $y$ and $\phi_c(y)$ from coordinate $x$ is the cause of the substantially rectangular cross section of the solid angle shown in FIG. 1, and the total optical path variation of such a groove is expressed as the sum $$\phi(x,y) = \phi(x) + \phi_c(y)$$

The basic nature of the optical path variations of such a groove is that it can be expressed as the sum of two components, the first component being a random function of position along the groove independent of position across the groove, and the second being a function of transverse position across the groove independent of position along the groove.

Figure 6:
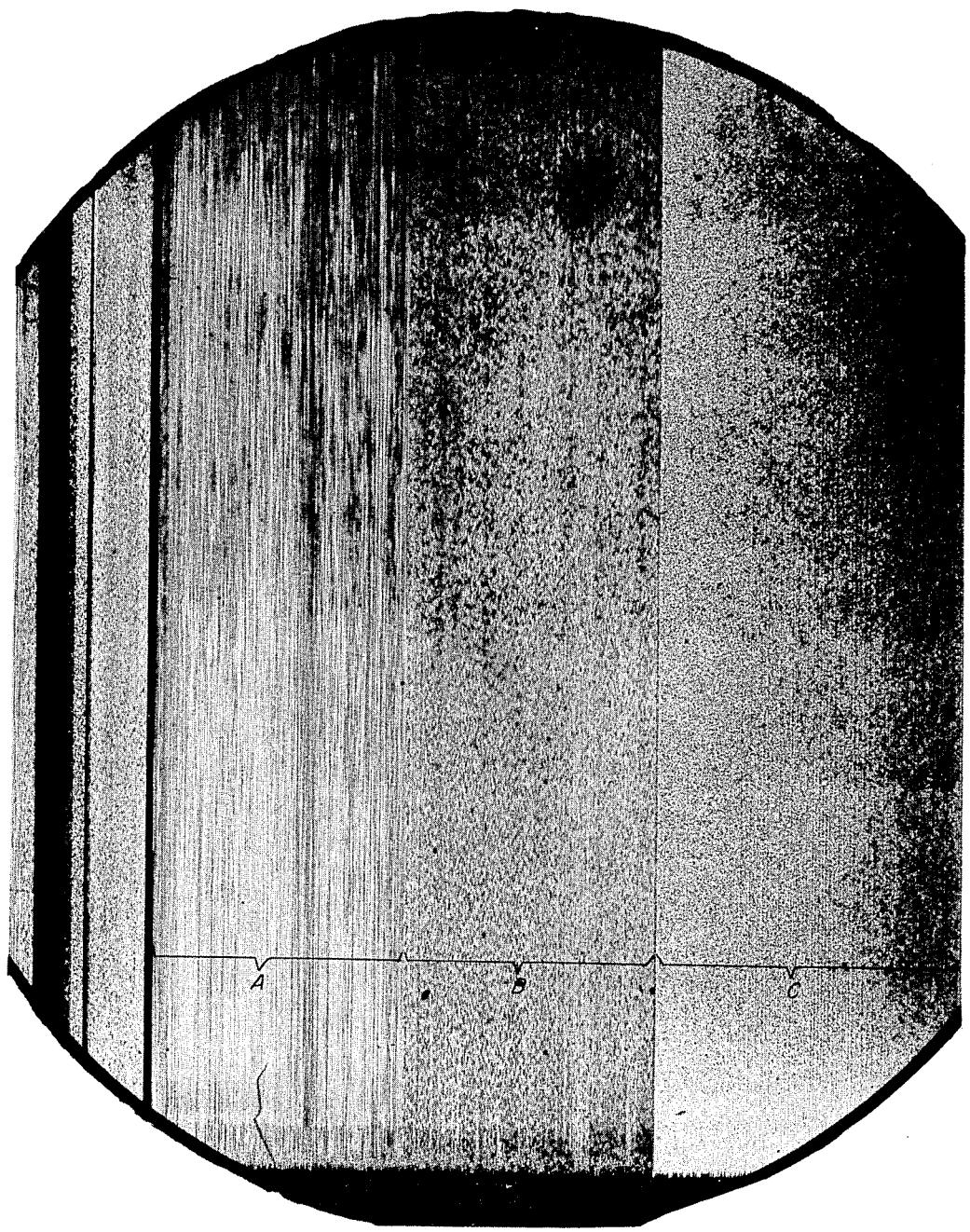
FIG. 6 is a photograph comparing the surface appearance of a radiation-redistributive device, structured and fabricated in accordance with the present invention with that of prior art devices.

In FIG. 6, the photograph compares the surface appearance of a projection screen structured in accordance with the present invention with that of similar screens structured in accordance with the disclosures of the aforementioned U.S. application Ser. No. 207,084, and U.S. application Ser. No. 207,082. Of the three large bands shown in the figure, band A shows the streaky texture which results from the presence of contiguous rows of equisized microelements which vary slightly in phase from row to row. Band B shows the improved texture which results when the microelements are somewhat randomized in size while yet retaining their shape, or integrity, as microelements. Band C shows the surface appearance of a screen structured in accordance with the present invention. The elimination of streaks and the esthetically pleasing, velvety texture resulting from the random undulations along the groove length are apparent. In addition, when used as a projection screen, the radiation-redistributive element containing the random optical path variations of the present invention shows an absence of disturbing interference fringes which are often caused by well-defined microelements of the prior art. All three screens are of the type which are structured to produce a substantially rectangularly shaped redistribution profile in mutually perpendicular planes normal to the screen surface, one plane being parallel to the groove length and the other being perpendicular thereto.

Figure 7A:
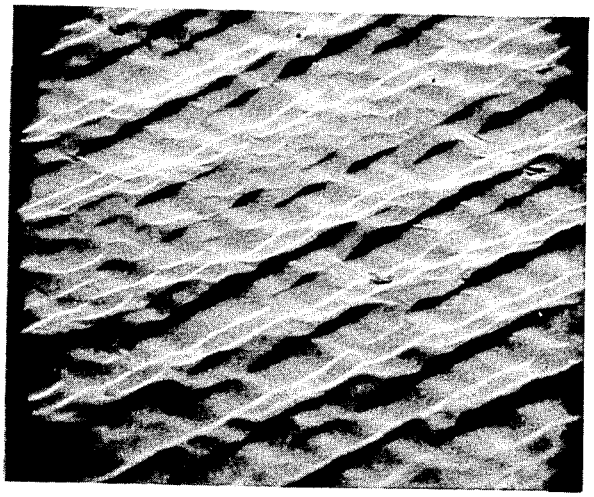
FIGS. 7(a) and 7(b) are photomicrographs comparing the structures of two devices similar to those shown in the FIG. 6 photograph.
Figure 7B:
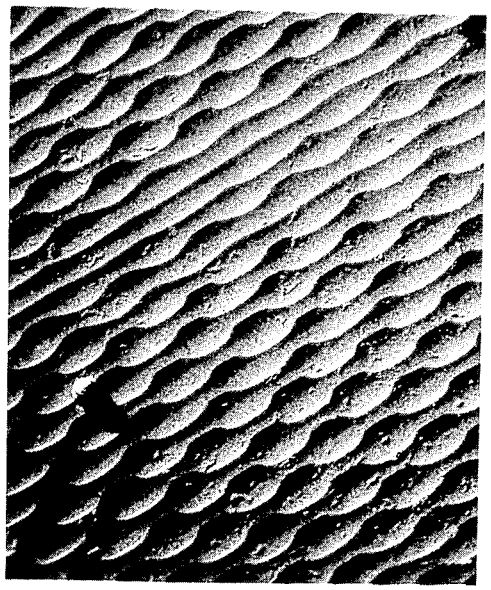

The photomicrographs of FIGS. 7 (a) and 7 (b) illustrate the structural differences between the radiation-redistributive device of the invention (shown in FIG. 7 (a)) and the device disclosed in the aforementioned U.S. application Ser. No. 207,084 (shown in FIG. 7 (b)). As is apparent, the depths and contours of the individual grooves in the surface shown in FIG. 7 (a) vary in a manner which is far less predictable (i.e., more random) than that of the grooves comprising the surface shown in FIG. 7 (b). Rather than defining discrete optical microelements which, while varying in size along the groove, have substantially identical optical powers, the variation in groove depth of the surface shown in FIG. 7(a) simply defines a randomly varying optical path which is regular only to the extent that, for any small length along the groove which is large compared to the relatively fine structure which defines optical path variations, the slope probability density profile has a substantially rectangular shape.

To fabricate radiation-redistributive devices having a radiation-distributing surface similar in appearance to that illustrated in band C of FIG. 6, various equipment and techniques conventionally employed in the sound recording industry can be employed. In FIG. 8 a side elevation of preferred cutting apparatus is shown in a cutting position relative to a workpiece 20 having a surface wherein the aforementioned grooves are to be formed. While the grooves can be cut directly in any readily workable material which itself can be used as the radiation-redistributive device, the preferred method of manufacture comprises the fabrication of a screen master in some workable material, such as acetate or wax, from which a negative matrix or press tool of correct contour can be subsequently made. The negative matrix can then be used to produce a multitude of positive radiation-redistributive devices by well known and economical duplicating processes, such as injection molding, embossing, pressing, or the like.

As shown in FIG. 8 the cutting apparatus comprises a conventional stereo sound-recording head 30 which includes a cutting stylus S. While a monaural sound-recording head could be used, a stereo head is preferred due to the high quality of auxiliary equipment available for conventional stereo heads. As in all sound recording heads, the cutting position of the stylus is determined by the waveform of an electrical signal applied to the recording head, such as through input cables 31. The recording head is mounted on a milling machine tool holder 32 by a cylindrical fitting 33. Means are provided for controlling the vertical position of fitting 33 in the tool holder 32 so as to provide a coarse, vertical adjustment of the recording head 30 above the workpiece. The workpiece may comprise, for instance, an aluminum plate 36 having an acetate coating 37, the thickness of which is sufficient to receive the grooves comprising the radiation-redistributive surface. Recording head 30 comprises a cutting assembly 40 having a horizontally extending support arm 41 which is slidably mounted on precision ways disposed in a saddle 42. By this arrangement, the horizontal position of cutting assembly 40 can be varied. Set screws 43a and 43b serve to lock arm 41 in a desired horizontal position. Saddle 42 is pivotally mounted about pin 44 disposed on recording head 30 so that the cutting stylus S, which forms a part of cutting assembly 40, can be pivoted into engagement with the upper surface of the workpiece. The pivotal movement of a cam 46 serves to raise and lower the stylus relative to the workpiece surface by contacting an arm 47 which is rigidly coupled with saddle 42. The cutting force applied to the stylus is controlled by screw 48 which serves to adjust the tension in spring 49. The precise depth of cut is controlled by adjustment screw 50 which varies the vertical distance of the stylus tip from a small glass ball follower 51 which rides on the uncut surface of the workpiece a short, horizontal distance away from the stylus.

A sound recording head which has been found particularly well adapted for cutting masters is the Westrex Corporation, Model 3D StereoDisc. As illustrated in FIG. 9, wherein a simplified constructional diagram of the mechanism which controls stylus movement is shown, each recording channel of the stereo recording head contains a magnetic coil form assembly 60, each of which contains a driving coil 62 located in separate pole pieces 64 and 65 which are attached to a single magnet 66.

The coil assemblies are attached to the stylus holder through links 68 which are stiff longitudinally, but flexible laterally. These links are braced in the center to prevent excessive lateral compliance. This structure results in a stiff, forward driving system with a high compliance in the lateral direction.

The cutting tip 72 of stylus S has a profile which is designed to conform with the desired transverse cross section of the grooves. A profile capable of producing uniform radiance when irradiated by normally incident radiation is disclosed in the aforementioned U.S. application Ser. No. 207,082. To assist in cutting the workpiece with the requisite accuracy and smoothness of finish, the stylus is heated by heating coil 73 to a temperature such as to soften adequately the acetate coating of the workpiece.

Figure 10:
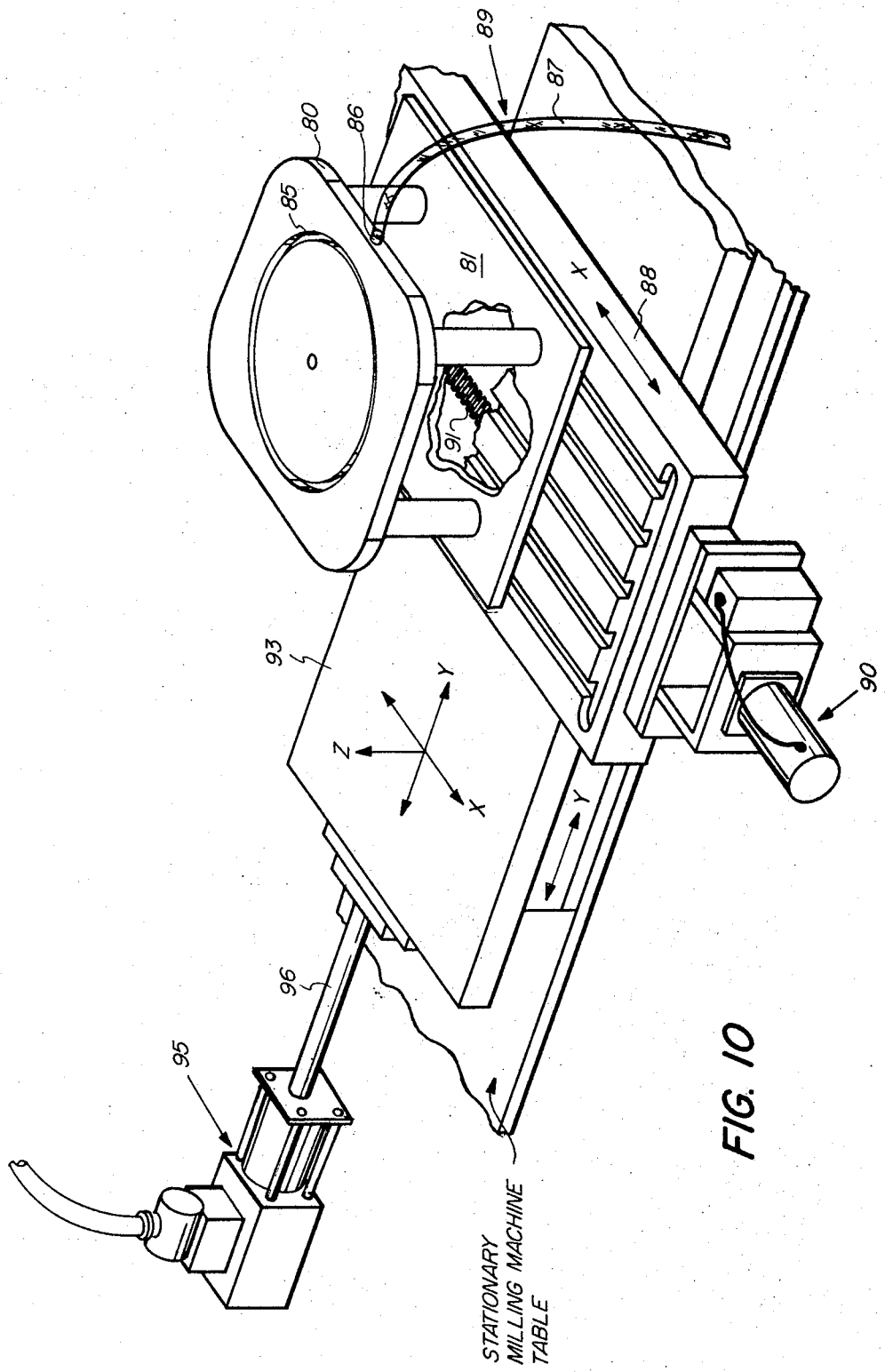
FIG. 10 is a perspective view of apparatus adapted to translate a blank master relative to the cutting apparatus of FIG. 8.

In fabricating a master by use of the apparatus described above, the workpiece is moved relative to the heated cutting stylus in a series of equally spaced, parallel traverses. At the same time, the cutting position of the stylus is electronically varied relative to the workpiece to produce the desired longitudinal cross section or depth profile. Apparatus for moving the workpiece relative to the stylus is depicted in FIG. 10. During the cutting operation, workpiece 20 is supported by a table 80 which is preferably fabricated from a non-magnetic metal, such as aluminum, so as not to interfere with the magnetic cutting assembly 40. In the upper surface of table 80, a circular groove 85 is provided. At the base of groove 85 is an opening (not shown) which communicates with a nozzle 86 located on the edge of the table. Attached to nozzle 86 via hose 87 is a vacuum source (not shown). By this arrangement, the workpiece is securely fastened to the surface of table 80 by a vacuum coupling. Table 80 is mechanically secured to a movable workbed 88 which comprises the x-y table 89 of a milling machine. Workbed 88 is movable in the x direction and its position is controlled with precision by a conventional stepping motor 90 which acts through lead screw 91. Workbed 88 itself rides atop a movable carriage 93, also forming a part of the milling machine carriage. Carriage 93 is movable in the y direction by a hydraulic pneumatic motor 95 which precisely controls the rate at which the table moves via piston rod 96.

To move the cutting stylus only in a vertical plane and at a rate which, when the workpiece is moved at a constant rate relative thereto, results in the longitudinal cross section or depth profile desired, the same signal must be applied, 180° out of phase (a peculiarity of the particular recording head), to both drive coils 62 of the cutting assembly.

Figure 11:
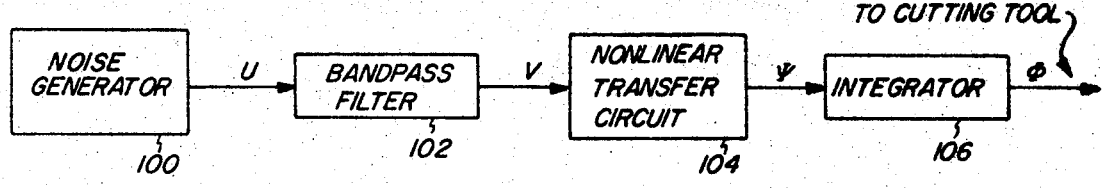
FIG. 11 is a block diagram of circuitry adapted to drive the cutting stylus of a sound-recording head to achieve a master for replicating the radiation-redistributive devices of the invention.
Figure 12A:
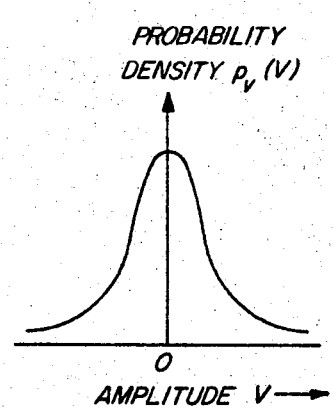
FIGS. 12(a) and 12(b) show the manner in which the Gaussian probability density of a preferred random signal input/to the nonlinear element is converted to a preferred slope probability density by the nonlinear element.
Figure 12B:
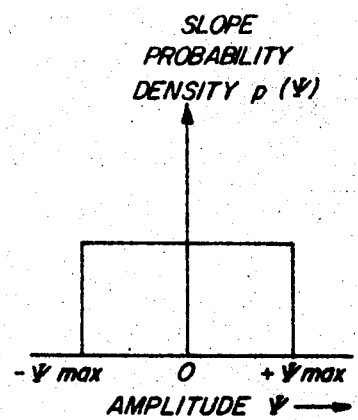

The waveform of the electrical signal applied to drive coils 62, of course, determines the depth profile of each of the grooves. Circuitry for generating a signal whereby the position of the cutting tool is varied in such a manner as to produce the randomized groove depth profile discussed above is shown in FIG. 11. As shown, the random output U of a noise generator 100 is fed to a conventional bandpass filter 102, preferably having a bandpass comprising all or part of the range between 100 and 15,000 hertz. Preferably, noise source 100 provides random signal U which is a representative sample of a Gaussian random process. However, as will become apparent, a wide variety of noise sources could be used. When the noise source is of the preferred Gaussian type, the amplitude probability density of the output signal V of the filter 102 is Gaussian shaped, as shown in FIG. 12a, regardless of the frequencies passed by filter 102, and the filter serves primarily to control the fineness of the structure defining optical path length variations along the groove depth. The filtered output V of bandpass filter 102 is passed through nonlinear transfer circuit element 104 which serves to convert the random signal V to a new random signal $\psi$ having an amplitude probability density profile substantially identical in shape as that of the desired radiation-redistributive profile. (See FIG. 12b.) Random signals V and $\psi$ are related by the expression $\psi = g(V)$, where $g(V)$ denotes the nonlinear function characteristic of circuit 104. The random signal $\psi$ is passed through an integrating circuit 106 and the resulting signal $\phi$ is then proportional to the desired groove depth profile or optical path variation along the groove length.

To determine the nonlinear function $g(V)$, it is necessary to know the desired slope probability density profile $p(\psi)$, which is selected to give a desired radiation-redistribution profile. This can be precisely determined by calculating the shape of a microelement which would give the desired redistribution profile and determine its probability density of slopes, $p(\psi)$, or, more simply, one can use the quite accurate approximation previously discussed, that the desired redistribution profile is essentially the same shape as the probability density $p(\psi)$ needed to produce it. Also needed is the amplitude probability density profile, $p_V(V)$, of the random input signal $V$, which can be readily measured if the noise generator is not of the Gaussian type. Knowing these variables, the required nonlinear element $g(V)$ can be calculated from the equation $$g(V) = \psi\left[2\int_{-\alpha}^{V} p_V(V')dV' - 1\right],$$

where $\psi(f)$ is the inverse curve of $f(\psi)$, which is given by the equation $$f(\psi) = 2\int_{-\alpha}^{\psi} p_\psi(\psi')d\psi' - 1.$$

As mentioned above, the probability density profile of the random signal $V$ input to the nonlinear element is preferably Gaussian in shape, $$p_V(V) = \frac{1}{\sqrt{2\pi}V_o} e^{-\left(\frac{V}{\sqrt{2}V_o}\right)^2}$$

where $V_o$ is the root mean square value of random signal $V$, as represented in FIG. 12(a). When such profile is Gaussian in shape, the above equation for the nonlinear element $g(V)$ takes a simpler form, $$g(V) = \psi[erf(V/\sqrt{2}V_o)]$$

where $erf(x)$ is the well knwon error function. For a preferred radiation redistribution profile as shown in FIG. 4, the probability density of the output $\psi$ of the nonlinear element must have approximately the same rectangular shape shown in FIG. 12(b), in which case the nonlinear element takes on the equation $$g(V) = \psi_{max} erf(V/\sqrt{2}V_o),$$

where $\psi_{max}$ is the maximum slope.

Figure 13:
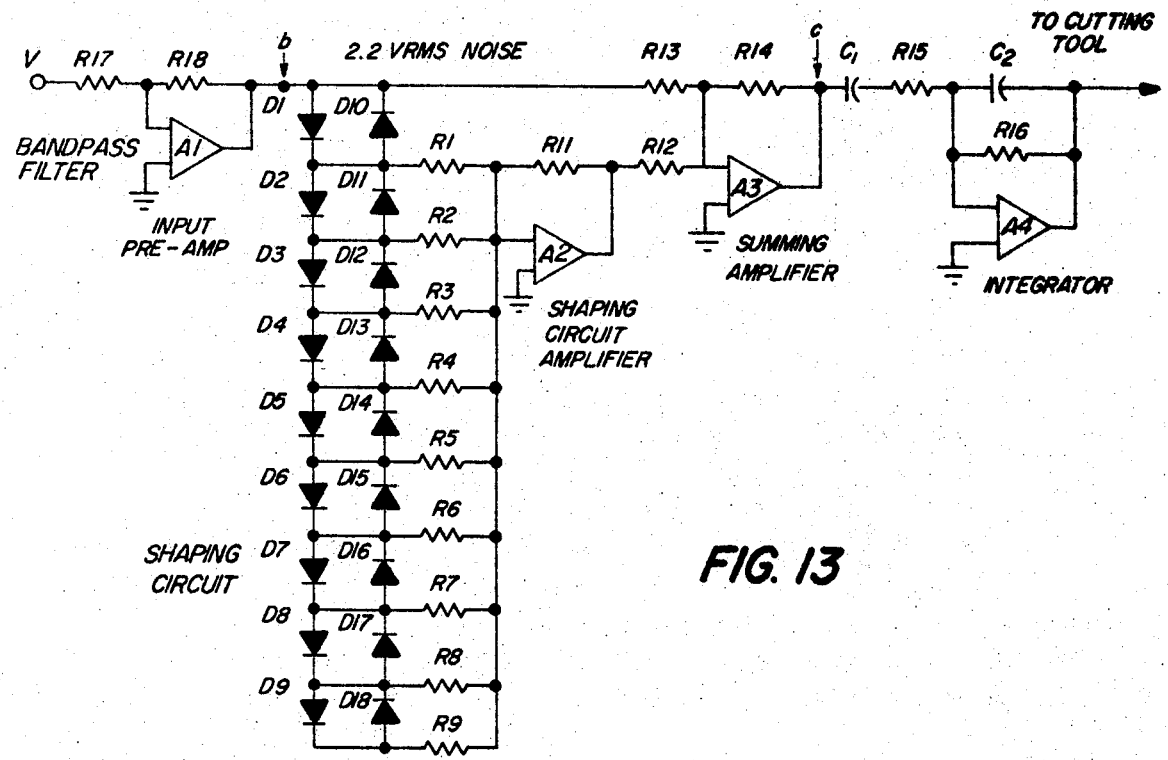
FIG. 13 is an electrical schematic of a preferred circuit for the non-linear circuit element and integrator depicted in FIG. 11.

The operation of the nonlinear circuit 104 is understood with reference to FIG. 13. An input pre-amp A1 provides gain and isolation of the bandpass filter 102 from the nonlinear shaping circuit elements of the circuit 104. Diodes D1–D18 along with resistors R1–R9 provide the heart of the nonlinear shaping circuit. The filtered signal V from the noise generator is amplified and inverted by input pre-amplifier A1. The output of amplifier A1 is then segmented by having to overcome successively the forward voltage drops of the series of silicon diodes D1–D18. Diode pairs are connected cathode-to-anode so that they act the same toward an input signal of either polarity.

As long as the signal at point $b$ is too small to overcome the drop across the first diode, no current is fed to the shaping circuit amplifier A2, and the output of summing amplifier A3 at point C is proportional to the input signal. However, as the input signal increases to a level greater than that required to overcome the drop across diode D1, any part of it in excess of the voltage drop of diode D1 or D2 sends current to the shaping circuit amplifier A2 through resistor R1. Similarly, when the signal at point $b$ becomes large enough to overcome the voltage drops of four diodes in series, it starts to supply current to the shaping circuit amplifier A2 through resistor R4, and so on. The current contributions of each of the segment are adjusted by selecting the values of resistors R1–R9. These currents are summed and converted by the shaping circuit amplifier A2 to a voltage of opposite polarity to the input voltage at point $b$. The outputs of the input pre-amp A1 and the shaping circuit amplifier A2 are added and inverted by the summing amplifier A3.

The result is that the signal at point C has the same polarity as the signal input to the input pre-amp A1, but the gain of the system decreases as the input amplitude increases according to the desired nonlinear relationship. Since the voltage drop across a silicon diode is about 0.5 volts, all of the segments are contributing to the output when the voltage at point $b$ is ±5 volts. The transfer curve is thus designed such that an input noise signal with a Gaussian probability density must have a voltage of 2.2 volts rms for the signal at point $b$ to have a rectangular probability density profile.

The values of the circuit elements in FIG. 13 required to produce a substantially rectangular slope probability density profile are:

| $R_1$ | .39 megohms | $R_{11}$–$_{14}$ | 10 kilohms – 1% |
|---|---|---|---|
| $R_2$ | .18 megohms | $R_{15}$ | 47 kilohms |
| $R_3$ | 68 kilohms | $R_{16}$ | 10 megohms |
| $R_4$ | 68 kilohms | $R_{17}$ | 10 kilohms |
| $R_5$ | 47 kilohms | $R_{18}$ | .47 megohms |
| $R_6$ | 47 kilohms | $C_1$ | .0 microfarads |
| $R_7$ | 82 kilohms | $C_2$ | .033 microfarads |
| $R_8$ | 68 kilohms | All diodes: | IN4454 |
| $R_9$ | .10 megohms | All amplifiers: | Analog Devices 118 |

It is not required that the signal $\phi$ be generated in an analog electrical fashion; all or part of the necessary steps can be accomplished other ways such as by computer. A computer can be used to effectively filter a random signal, operate on it with a nonlinear step, and integrate it in direct analogy to the situation indicated in FIG. 11. It is even possible to have the computer generate a random signal in place of the noise generator. This offers some advantages over the analog electrical techniques, since the computer could be programmed to produce a two-dimensional random optical path signal which, when converted to optical path variation by some means such as the photographic relief techniques described by R. Lamberts in U.S. application Ser. No. 186,130, could have light-redistributing properties which vary over the element; for example, a fresnel lens-effect could be incorporated.

Figure 2:
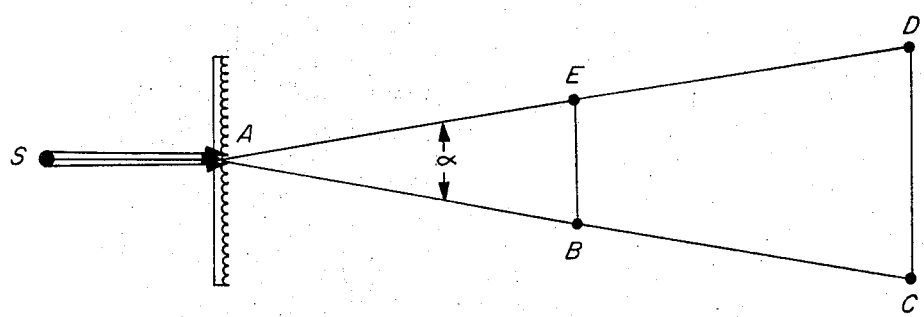
FIGS. 2 and 3 are magnified, transverse and longitudinal cross sections of the FIG. 1 device taken along the section lines 2—2 and 3—3, respectively.

A radiation-redistributive device made by the above-mentioned relief image techniques has optical path variations which are random in both of two perpendicular traverse cross sections, i.e., the cross sections shown in FIGS. 2 and 3 would have both a random appearance such as indicated in FIG. 3. Such a radiation-redistributive device will redirect radiation into a solid angle of substantially rectangular cross section as discussed earlier, due to the nature of the optical path variations. Again, if $x$ and $y$ denote coordinates in the plane of the device in the directions of the two transverse cross sections, the optical path variations of such an element are expressed by $$\phi(x,y) = \phi_1(x) + \phi_2(y)$$

where $\phi_1$ and $\phi_2$ are random optical paths variations measured along the two coordinates, each having predesired slope probability densities. The total optical path variation is the sum of two parts, each of which depends only upon one of the coordinates and is independent of the others.

When the optical path variation of an element can be expressed as a sum of two terms each of which depends on, or is a function of, only one of two perpendicular transverse coordinates, any small area A of that element will redistribute normally incident light into a solid angle of substantially rectangular cross section, it being realized that said substantially rectangular cross section may depart somewhat from rectangular, particularly for redirective elements directing light into larger solid angles in which case the cross section may distort into familiar, substantially rectangular shapes commonly termed "pincushion" or barrel "distortion." These substantially rectangular cross sections are, however, clearly distinct from circular or elliptical cross sections typical of prior art redistributive devices such as ground glass or Kodak Ektalite screen materials.

The following example further illustrates the manner in which radiation-redistributive devices of the invention, as shown in band C of FIG. 6, are produced.

EXAMPLE 1

Figure 14:
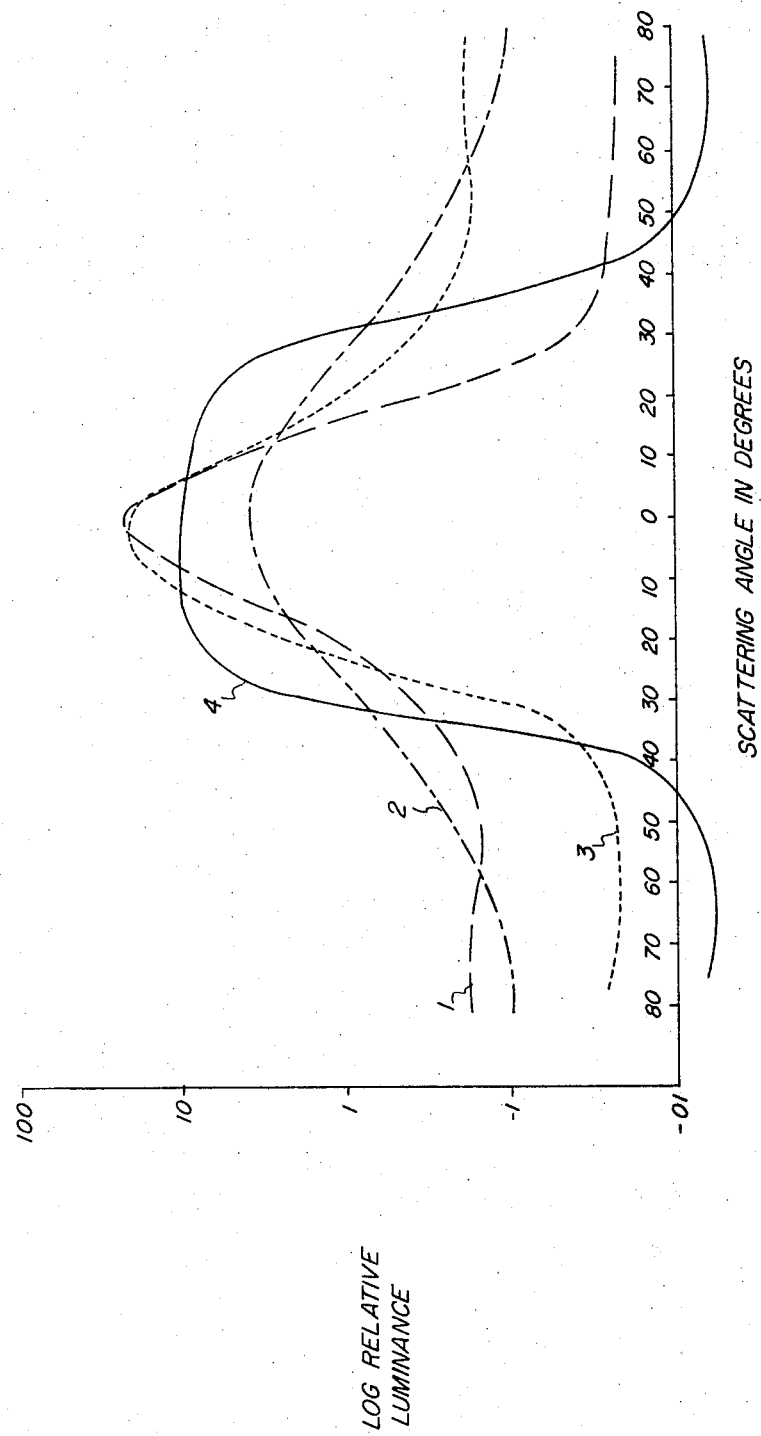
FIG. 14 is a graph showing giniophotometric curves comparing performances of various radiation-redistributive surfaces.

The output from a random noise generator, manufactured by H. H. Scott (Type 811-B) was fed to a bandpass filter, manufactured by Krohn-Hite (Model 330 MR). The noise generator output had a Gaussian distribution. The pass band of the filter was adjusted to 316-1,000 hertz. The output of the filter was passed through an analog amplifier with a gain of 47, and into a nonlinear circuit, as depicted in FIG. 13. The rms voltage into the non-linear circuit was 2.2 volts. The equation of the non-linearity was $V_o = 2\,erf[V_i/2.2(\sqrt{2})]$, where $V_i$ is the input and $V_o$ is the output. This voltage was then passed through an analog integrating circuit and then to a Westrex sound recording head to modulate the cutting position of the stylus. During modulation of the stylus, a workpiece comprising an aluminum plate having an acetate coating thereon was removed relative to the stylus in a series of equally spaced, parallel traverses, whereby contiguous grooves of varying depth were formed in the acetate coating of the workpiece. The speed of the workpiece relative to the stylus was 2.3 inches per second. The result was a projection screen master from which the photomicrograph of FIG. 7(a) was taken, and which was used to replicate projection screens by conventional molding techniques. The goniophotometric curves in FIG. 14 compare the performance of various radiation-redistributive surfaces (Curves 1, 2 and 3) with the surface produced by the process described above (Curve 4). Curves 1 and 2 illustrate the radiation-redistribution patterns characteristic of ground glass and of a Polacoat Corporation screen material (Type LS60PL) respectively. Curve 3 is characteristic of a surface cut by feeding the Gaussian random waveform directly to the sound recording head (i.e., bypassing the non-linear transfer circuit and integrator). As is apparent from the goniophotometric curves, Curve 4 has greatly suppressed "tails" or light scattered at high angles, and much more uniformly scattered light at low angles. Unlike curves 1–3, Curve 4 is substantially rectangular in shape, as it should be since it was designed to scatter radiation equivalent to a microparabolic element. Curve 4, of course, resulted from goniophotometric measurements in a plane perpendicular to the radiation redistributing surface and parallel to the direction in which the grooves extend.

The following example describes a process whereby radiation-redistributive devices having random optical path variations in both of two mutually perpendicular planes normal to the surface of such device can be produced.

EXAMPLE 2

The output of a random noise generator (H. H. Scott, Type 811–B) was fed through a bandpass filter (Krohn-Hite, Model 310–ABR). The pass band of the filter was set from 316-3160 Hertz and the output of the noise generator was adjusted to give 2.2 volts rms at the output of the filter. The output of the bandpass filter had a Gaussian distribution, and this signal was passed through the nonlinear circuit and integrating circuit depicted in FIG. 13. The output of the integrator was then recorded in digital form on a magnetic tape by an Ampex TM–9 tape deck after passing through a Redcor Multiplexer Analog-Digital Converter (Series 663) and a Varian Datamachine (620A).

This magnetic tape served as the input for a PDP-10 digital computer and the signal it contained, in digital form, was proportional to the desired random optical path for each of the transverse coordinates of the radiation-redistributive device. The PDP-10 computer was programmed to generate an intermediate signal, using the relief transfer characteristic and modulation transfer curves described by Lamberts in an article entitled "Characterization of a Bleached Photographic Material," Applied Optics 11, page 33 (1972). This intermediate signal was used to drive a KS Paul Color Scanner, operating in a monochrome mode, after digital-analog conversion by a Versalogic DA-18 converter. An intermediate transparency was thus produced by the scanner as a one dimensional random-density variation on 11 × 14 inch DuPont Scanner Film with conventional D-19 nitrogen-burst processing. This intermediate random density transparency was placed in contact, and at right angles to, a second similar intermediate transparency so that the combination is radom in each of two perpendicular transverse coordinates. The programming of the PDP–10 computer insures that these density patterns, when exposed in the manner described below, produce a relief image, hence an optical path variation, which is proportional to the desired random optical path variation.

The crossed transparencies were imaged at 5×reduction onto Kodak Spectroscopic plates, Type 649F, coated 40 microns thick, to finally produce random optical path variations in the spatial frequency range of 5–50 cycles per millimeter. The following processing steps were used:

1. Kodak Developer SD–48 (10 min.)
2. Kodak Indicator Stop Bath (1 min.)
3. Kodak Rapid Fixer with Hardener (10 min.)
4. Wash (15 min.)
5. Bleach in modified Kodak Bleach Bath, modified as disclosed by R. L. Lamberts in the above-mentioned article.

6. Wash (15 min.)
7. Clear in Kodak Clearing Bath CB-1 (1 min.)
8. Wash (10 min.)
9. Isopropyl Alcohol, 50 percent soln. (1 min.)
10. Isopropyl Alcohol (1 min.)
11. Fresh Bath Isopropyl Alcohol (1 min.)
12. Dry.

The resulting diffuser was approximately 2 inches square and was replicated by a well known molding technique to produce a transparent, radiation-redistributive device, random in each of two mutually perpendicular planes.

While a preferred embodiment of the instant radiation-redistributive device is a transmissive device with a randomly varying surface height producing the random optical path variation, it is understood that either reflective or transmissive elements or combinations thereof having random optical path variations as herein disclosed in either transmission or reflection are suitable, such random optical path variations being provided by relief variations or internal refractive index variations or combinations thereof.

This invention has been described in detail with particular reference to preferred embodiments thereof, but it will be understood that variations and modifications can be effected within the spirit and scope of the invention.

We claim:

1. A radiation-redistributive device comprising an optical layer having structure therein defining random optical path length variations in at least one plane normal to the surface of such layer, the optical path length varying according to a waveform which is random at least to the extent that the slope of said waveform is, at any point, unpredictable within a predefined range of slope values from the knowledge of the slope at other points on said waveform, except as restricted by the frequency spectrum of the waveform and the probability density of slopes characteristic of the waveform.

2. The invention according to claim 1 wherein the contour of the transverse cross section of each of the grooves is defined by substantially the same curve.

3. The invention according to claim 2 wherein said structure defining optical path variations comprises means defining variations in refractive index in said layer.

4. A radiation-redistributive device comprising an optical layer in which a plurality of contiguous grooves are formed, said grooves being of a randomized depth, measured along the groove length, which varys according to a waveform having a predetermined range of slope values, the relative frequency of occurrence of a given slope value on such waveform being preselected but the slope value at any given point on the waveform being unpredictable from a knowledge of the slope at other points on the waveform.

5. The invention according to claim 4 wherein said grooves are substantially rectilinear.

6. A radiation-redistributive device comprising an optical layer in which the optical path length, measured in at least one plane normal to the surface of said layer, varies in a generally random fashion, the slopes of said optical path varying within a predetermined range and the frequency distribution of said optical path variations being preselected but the slopes of said optical path being unpredictable from point to point in said plane, each small area on said layer being adapted to redistribute normally incident radiation into a solid angle of substantially rectangular cross section, 7. The invention according to claim 6 wherein said small area appears substantially uniformly bright when viewed along a line formed by the intersection of said plane and a plane parallel to the surface of said optical layer.

8. The invention according to claim 6 wherein the radiation-redistribution profile measured along a line formed by the intersection of said plane and a plane parallel to the surface of said layer is substantially rectangular in shape.

9. The invention according to claim 6 wherein the optical path variations are produced by a plurality of contiguous rectilinear grooves of undulating depth formed in said optical layer.

10. The invention according to claim 6 wherein said optical path variations are formed, at least in part, by variations in refractive index in said optical layer.

11. The invention according to claim 6 wherein the optical path length variations measured in all planes parallel to said plane are substantially identical to structure.

12. The invention according to claim 6 wherein the optical path length variations measured in said plane and in at least one other plane parallel to said plane are substantially different in detail, but nevertheless have substantially the same slope probability density.

13. A radiation-redistributive device comprising an optical layer having structure therein defining random optical path length variations in at least one plane normal to the surface of such layer, the optical path length varying in such a manner that radiation normally incident on a small area of the layer, such area being small compared to the entire area of the layer itself, but large compared to the transverse dimension of the structure defining optical path length variations within the layer, is redirected into such plane in an amount and at an angle such that said small area appears uniformly bright when viewed along a line formed by the intersection of said plane and a plane parallel to the surface of said layer.

14. The invention according to claim 13 wherein said strucure defining optical path variations is provided by a plurality of contiguous, rectilinear grooves, the depth of such grooves undulating along the groove length according to the waveform which is random at least to the extent that the slope of said waveform is, at any point, unpredictable within a predefined range of slope values, from knowledge of the slope at other points on said waveform, except as restricted by the frequency spectrum of the waveform and the probability-density of slopes characteristic of the waveform.

15. The invention according to claim 13 wherein the contour of the transverse cross section of each of the grooves is defined by substantially the same curve.

16. The invention according to claim 13 wherein said structure defining optical path variations comprises means defining variations in refractive index in said layer.

17. A method for making radiation-redistributive devices comprising an optical element wherein the optical path length, measured in at least one plane normal to a surface of such element, varies in such a manner that the rate of change in optical path length in such plane has a predesired probability density profile, said method comprising the steps of:

a. generating a first noise signal V having a known amplitude probability density profile $p_V(V)$;

b. passing said first noise signal V through a nonlinear circuit having a transfer function $g(V)$ which satisfies the equation $$g(V) = \psi\left[2\int_{-\alpha}^{V} p_V(V')dV' - 1\right],$$

where $\psi(f)$ is the inverse curve of $f(\psi)$, which is defined by the equation $$f(\psi) = 2\int_{-\alpha}^{\psi} p_\psi(\psi')d\psi' - 1,$$

whereby a second noise signal $\psi$ is produced which has an amplitude probability density profile $p(\psi)$ substantially identical in shape to said predesired probability density profile of the rate of change in optical path length;

c. integrating the second noise signal $\psi$ to produce a random signal $\phi$; and d. utilizng a random signal $\phi$ to produce optical path length variations in the optical element in said plane, the optical path length at any point being proportional to the instantaneous amplitude of random signal $\phi$.

18. The method according to claim 17 further comprising the steps of moving said optical element and a cutting tool relative to one another whereby a plurality of contiguous grooves are formed in a surface of said optical element; and utilizing signal $\phi$ to vary the cutting position of the cutting tool, whereby the depth of each of the grooves is proportional to the instantaneous amplitude of signal $\phi$.

19. A method for making radiation-redistributive devices comprising an optical element wherein the optical path length, measured in at least one plane normal to a surface of such element, varies in such a manner that the rate of change in optical path length in such plane has a predesired probability density profile, said method comprising the steps of:

a. generating a first noise signal V having a known amplitude probability density profile $p_V(V)$;

b. passing said first noise signal V through a nonlinear circuit having a transfer function g(V) which satisfies the equation $$g(V) = \psi\left[2\int_{-\alpha}^{V} p_V(V')dV' - 1\right],$$

where $\psi(f)$ is the inverse curve of $f(\psi)$, which is defined by the equation $$f(\psi) = 2\int_{-\alpha}^{\psi} p_\psi(\psi')d\psi' - 1,$$

whereby a second noise signal $\psi$ is produced which has an amplitude probability density profile $p(\psi)$ substantially identical in shape to said predesired probability density profile of the rate of change in optical path length;

c. integrating the second noise signal $\psi$ to produce a random signal $\phi$;

d. advancing a workpiece and a cutting tool relative to one another in a series of equally spaced parallel traverses, thereby cutting a plurality of contiguous, rectilinear grooves in the surface of the workpiece;

e. utilizing random signal $\phi$ to vary the cutting position of the cutting tool so as to vary the depth of each groove in accordance with the instantaneous amplitude of signal $\phi$; and f. replicating said radiation-redistributive devices from the cut surface of said workpiece.

20. Apparatus for fabricating radiation-redistributive devices comprising an optical element wherein the optical path length, measured in a set of parallel planes normal to the surface of such element, varies in such a manner that the rate of change in optical path length of such planes has a predesired probability density profile, said apparatus comprising:

a. means for generating a first noise signal V having a known amplitude probability density profile $p_V(V)$;

b. a nonlinear circuit, operatively connected to said noise generating means, having a transfer function $g(V)$ which satisfies the equation $$g(V) = \psi\left[2\int_{-\alpha}^{V} p_V(V')dV' - 1\right],$$

where $\psi(f)$ is the inverse curve of $f(\psi)$, which is defined by the equation $$f(\psi) = 2\int_{-\alpha}^{\psi} p_\psi(\psi')d\psi' - 1,$$

whereby a second noise signal $\psi$ is produced which has an amplitude probability density profile $p(\psi)$ substantially identical in shape to said predesired probability density profile of the rate of change in optical path length;

c. means for integrating noise signal $\psi$ to produce a random signal $\phi$; and d. means for varying the optical path length of said optical element in said parallel planes according to the instantaneous amplitude of random signal $\phi$.

21. The invention according to claim 20 wherein said optical path varying means comprises means for cutting a plurality of contiguous grooves in a surface of said optical element, and means for varying the depth of such grooves along the groove length in accordance with the instantaneous amplitude of random signal $\phi$.

22. A method for making radiation-redistributive devices comprising an optical element wherein the optical path length, measured in at least one of a set of parallel planes normal to the surface of such element, varies in such a manner that the rate of change in optical path length measured at contiguous points in such plane over a substantial length has a substantially rectangularly shaped probability density profile, said method comprising the steps of:

a. generating a first noise signal V having an amplitude probability density profile $p_V(V)$ which satisfies the equation $$p_V(V) = \frac{1}{\sqrt{2\pi}V_o} e^{-\left(\frac{V}{\sqrt{2}V_o}\right)^2}$$

where $V_o$ is the root means square value of random signal V;

b. passing said first noise signal V through a nonlinear circuit having a transfer function $g(V)$ which satisfies the equation $$g(V) = \psi_{max} \mathrm{erf}(V/\sqrt{2}V_o),$$

where $\mathrm{erf}$ is the error function and $\psi_{max}$ is the maximum rate of change in optical path length in said planes, whereby a second noise signal $\psi$ is produced having a substantially rectangularly shaped amplitude probability density profile;

c. integrating the second noise signal $\psi$ to produce a random signal $\phi$; and d. utilizing random signal $\phi$ to produce optical path length variations of the optical element in said planes, the optical path length at any point being proportional to the instantaneous amplitude of random signal $\phi$.

23. The method according to claim 21 further comprising the step of bandpass filtering signal V prior to passing signal V through the nonlinear circuit to limit the frequency content of signal V.

24. The method according to claim 21 further comprising the steps of moving said optical element and a cutting tool relative to one another whereby a plurality of contiguous grooves are formed in a surface of said optical element; and utilizing signal $\phi$ to vary the cutting position of the cutting tool, whereby the depth of each of the grooves cut thereby is proportional to the instantaneous amplitude of signal $\phi$.

25. A method for making radiation-redistributive devices comprising an optical element wherein the optical path length, measured in at least one of a set of parallel planes normal to the surface of such element, varies in such a manner that the rate of change in optical path length measured at contiguous points in such plane over a substantial length has a substantially rectangularly shaped probability density profile, said method comprising the steps of:

a. generating a first noise signal V having an amplitude probability density profile $p_V(V)$ which satisfies the equation $$p_V(V) = \frac{1}{\sqrt{2\pi}V_o} e^{-\left(\frac{V}{\sqrt{2}V_o}\right)^2}$$

b. passing said first noise signal V through a nonlinear circuit having a transfer function $g(V)$ which satisfies the equation $$g(V) = \psi_{max} \mathrm{erf}(V/\sqrt{2}V_o),$$

where $\mathrm{erf}$ is the error function and $\psi_{max}$ is the maximum rate of change in optical path length in said planes, whereby a second noise signal $\psi$ is produced having a substantially rectangularly shaped amplitude probability density profile;

c. integrating the second noise signal $\psi$ to produce a random signal $\phi$; and d. advancing a workpiece and cutting tool relative to one another in a series of equally spaced parallel traverses, thereby cutting a plurality of contiguous, rectilinear grooves in the surface of the workpiece;

e. utilizing random signal $\phi$ to vary the cutting position of the cutting tool so as to vary the depth of each groove in accordance with the instantaneous amplitude of signal $\phi$; and f. replicating said radiation-redistributive devices from the cut surface of said workpiece.

26. A radiation-redistributive device comprising an optical layer having a variation of optical path length, measured in a pair of perpendicular planes normal to said layer and intersecting said layer along first and second lines defining first and second transverse coordinate axes, which is a first function of said first coordinate plus a second function of said second coordinate, said first and second functions varying in a generally random fashion within a predetermined frequency range and the slope of said functions having predetermined slope probability density profiles while being unpredictable from point to point along said coordinate axes.

27. A radiation-redistributive device according to claim 26 wherein said first and second functions are substantially identical.

28. A radiation-redistributive device according to claim 26 wherein said first and second functions have different slope probability densities.

29. A radiation-redistributive device according to claim 26 wherein all or part of the variations of said optical path length are produced by surface contours.

30. A radiation-redistributive device according to cliam 26 wherein all or part of the variations of said optical path length are produced by refractive index variations.

31. A radiation-redistributive device comprising an optical layer wherein a plurality of contiguous rectilinear grooves are formed, the optical path variation of at least one of said grooves measured along first and second coordinate axes on said surface, said first coordinate axis being parallel to the groove direction and said second coordinate axis being perpendicular to the groove direction, being a first function of said first coordinate plus a second function of said second coordinate, said first function varying in a generally random fashion within a predetermined frequency range and having a predetermined slope probability density while the slope is unpredictable from point to point along said first coordinate axis.

32. A radiation-redistributive device according to claim 31 wherein said second function of said second coordinate is a deterministic curve.

33. A radiation-redistributive device according to claim 31 wherein said first functional variations are different for each said groove, but possessing the same slope probability densities.

34. A radiation-redistributive device according to claim 31 wherein part of the optical path variation along said grooves is due to refractive index variations.

* * * * *

UNITED STATES PATENT OFFICE
CERTIFICATE OF CORRECTION

Patent No. 3,809,457  Dated May 7, 1974

Inventor(s) Clark N. Kurtz and James J. DePalma

It is certified that error appears in the above-identified patent and that said Letters Patent are hereby corrected as shown below:

Column 3, line 66, "giniophotometric" should read --goniophotometric--;

Column 9, that part of the first formula reading:

" $\left[2\int_{-\alpha}^{V}\right.$ " should read -- $\left[2\int_{-\infty}^{V}\right.$ --;

Column 9, that part of the second formula reading:

" $2\int_{-\alpha}^{\psi}$ " should read -- $2\int_{-\infty}^{\psi}$ --;

Column 9, line 39, "knwon" should read --known--;

Column 10, line 7, "segment" should read --segments--;

Column 10, line 58, "traverse" should read --transverse--;

Column 10, line 59, "have both" should read --both have--;

Column 11, line 47, "removed" should read --moved--;

Column 14, line 22, the second "to" should read --in--;

Column 14, line 52, "probability-density" should read --probability density--;

PO-1050
(5/69)

UNITED STATES PATENT OFFICE
CERTIFICATE OF CORRECTION

Patent No. 3,809,457      Dated May 7, 1974

Inventor(s) Clark N. Kurtz and James J. DePalma

It is certified that error appears in the above-identified patent and that said Letters Patent are hereby corrected as shown below:

Column 13, line 42, the word "grooves" should read --optical path length variations--.

Column 15, that part of the first formula reading:

" $\left[ 2 \int_{-\alpha}^{V} \right.$ " should read -- $\left[ 2 \int_{-\infty}^{V} \right.$ --;

Column 15, that part of the second formula reading:

" $2 \int_{-\alpha}^{V}$ " should read -- $2 \int_{-\infty}^{V}$ --;

Column 15, line 26, "utilizng a" should read --utilizing--;

Column 15, that part of the third formula reading:

" $\left[ 2 \int_{-\alpha}^{V} \right.$ " should read -- $\left[ 2 \int_{-\infty}^{V} \right.$ --;

Column 15, that part of the fourth formula reading:

" $2 \int_{-\alpha}^{V}$ " should read -- $2 \int_{-\infty}^{V}$ --;

Column 16, line 21, "of" should read --in--;

Page 3

UNITED STATES PATENT OFFICE
CERTIFICATE OF CORRECTION

Patent No. 3,809,457  Dated May 7, 1974

Inventor(s) Clark N. Kurtz and James J. DePalma

It is certified that error appears in the above-identified patent and that said Letters Patent are hereby corrected as shown below:

Column 16, that part of the first formula reading:

" $\left[2\int_{-\alpha}^{V}\right.$ " should read -- $\left[2\int_{-\infty}^{V}\right.$ --;

Column 16, that part of the second formula reading:

" $2\int_{-\alpha}^{V}$ " should read -- $2\int_{-\infty}^{V}$ --;

Column 17, line 32, "contingu-" should read --contigu- --;

Column 18, line 3, the word --a-- should be inserted after the word and.

Column 18, line 43, "variation" should read --variations--;

Signed and sealed this 10th day of December 1974.

(SEAL)
Attest:

McCOY M. GIBSON JR.
Attesting Officer

C. MARSHALL DANN
Commissioner of Patents